US005703145A

United States Patent [19]

Sagawa et al.

[11] Patent Number: 5,703,145

[45] Date of Patent: Dec. 30, 1997

[54] HOT MELT TYPE INK COMPOSITION FOR INK JET

[75] Inventors: Akemi Sagawa; Masahiko Sakai; Michio Ebata; Ren Itoh, all of Ibaraki, Japan

[73] Assignee: Hitachi Koki Co., Ltd., Tokyo, Japan

[21] Appl. No.: 551,036

[22] Filed: Oct. 31, 1995

Related U.S. Application Data

[63] Continuation of Ser. No. 268,024, Jun. 29, 1994, abandoned.

[30] Foreign Application Priority Data

Jun. 30, 1993 [JP] Japan ................................ 5-162363

[51] Int. Cl.[6] .................................................. C09D 11/10
[52] U.S. Cl. ........................ 523/161; 523/160; 524/275; 524/277; 524/279
[58] Field of Search ................................ 523/160, 161; 524/275, 277, 279

[56] References Cited

U.S. PATENT DOCUMENTS

| | | | |
|---|---|---|---|
| 3,461,092 | 8/1969 | Story | 524/275 |
| 3,756,981 | 9/1973 | Breitschaft | 524/277 |
| 4,066,585 | 1/1978 | Schepp | 524/279 |
| 4,148,767 | 4/1979 | Spicer et al. | 524/277 |
| 4,404,035 | 9/1983 | Ona et al. | 524/277 |
| 4,409,373 | 10/1983 | Wiemers et al. | 524/279 |
| 4,636,258 | 1/1987 | Hayashi et al. | 524/275 |
| 4,808,227 | 2/1989 | Yusa | 523/161 |
| 5,350,789 | 9/1994 | Sagawa et al. | 524/313 |

*Primary Examiner*—Vasu S. Jagannathan
*Assistant Examiner*—John J. Guarriello
*Attorney, Agent, or Firm*—Sughrue, Mion, Zinn, Macpeak & Seas, PLLC

[57] ABSTRACT

There is disclosed a hot melt type ink for an ink jet which has a small rate of a volume change accompanied with a phase change from a melt status to a solid matter and does not cause an offset and which provides a clear color image on an OHP sheet. The above ink composition has a volume change rate falling in a range of less than 10%, preferably 8 to 4% and a phase change temperature range of 60° C. to the jetting temperature.

10 Claims, 1 Drawing Sheet

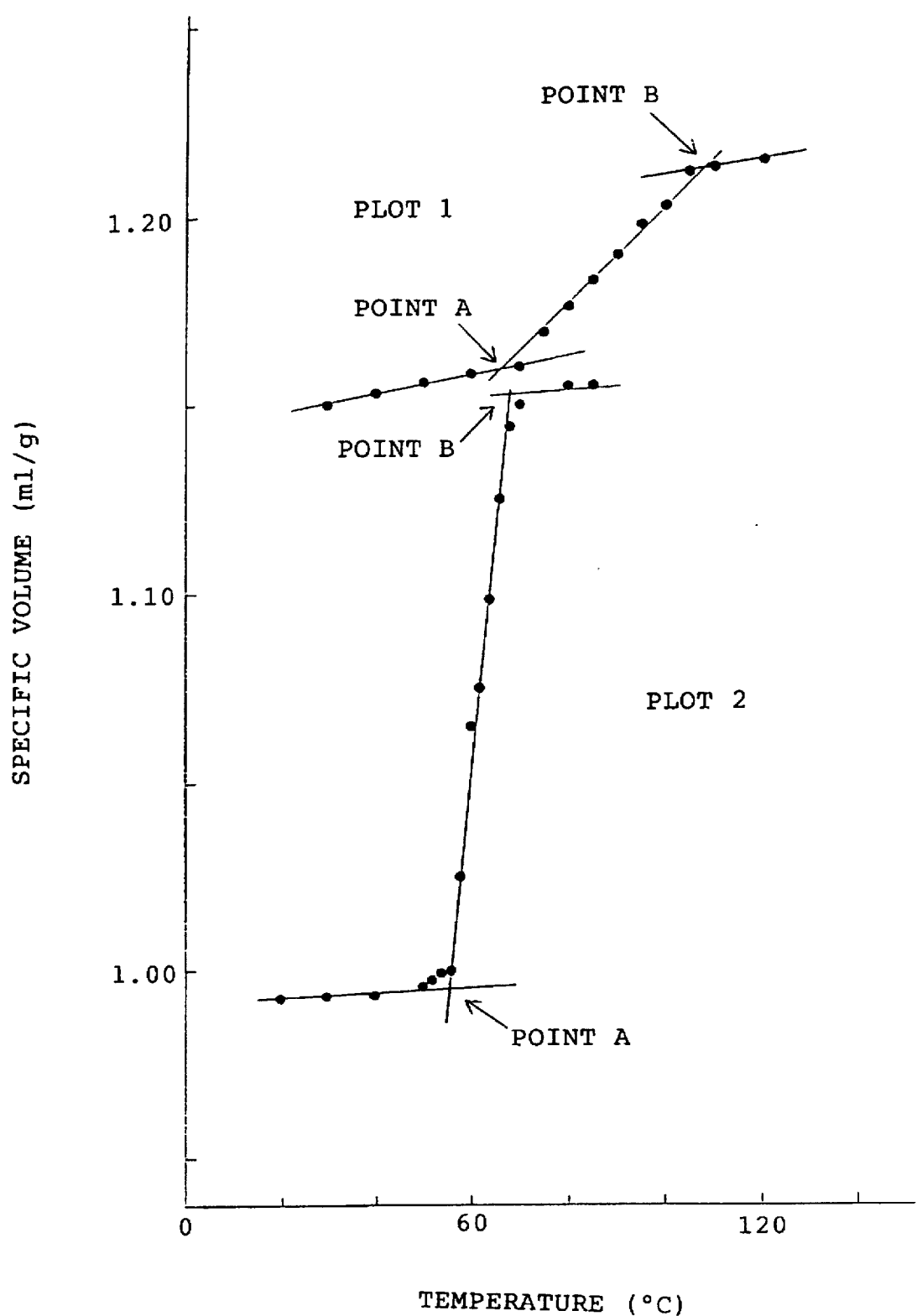

HOT MELT TYPE INK COMPOSITION FOR INK JET

This is a continuation of application No. 08/268,024 filed Jun. 29, 1994, now abandoned.

FIELD OF THE INVENTION

The present invention relates to a hot melt type ink composition for an ink jet.

BACKGROUND OF THE INVENTION

A water soluble liquid ink composition has so far been used as an ink composition for an ink jet recording. However, recording on a paper into which an ink is liable to soak causes "blur" and accordingly, the paper to be used in the recording is limited to a processed paper. Further, recording on an overhead projector (hereinafter referred to as OHP) sheet requires a specific treatment on the sheet surface because of a poor drying property of an ink. Because of this, there is proposed a hot melt type ink jet recording system in which a hot melt type ink composition containing a wax which is a solid matter at a room temperature is used as an ink composition providing a good printing quality regardless of a paper quality and is liquefied by heating; any energy is added to allow it to jet on a paper and it is cooled and solidified on the paper to form a recording dot.

The big advantages of the hot melt type ink jet system described above include the matters that stain is not caused in handling because the above ink is solid at a room temperature, that since an evaporated amount of the ink in melting can be minimized, a nozzle is not clogged and that since it is solidified immediately after jetting, "blur" is not caused and various papers such as a drawing paper and a post card as well as a Japanese paper can be used without providing a pretreatment.

However, since the hot melt type ink described above contains a wax as a primary component, a rate of a volume change accompanied with a phase change from a melt status to a solid matter is as very large as an order of 15%, and it has a defect that after cutting an electric power supply, air gets into the interval between a space formed by a shrunk volume of the ink and a jet nozzle and this is turned into a bubble in melting once again to clog a nozzle and cause a part of the nozzles to fail in jetting. In order to prevent air from getting into, a countermeasure has so far been taken by covering the end of the nozzle with a cap or repeating purge to drive air out.

As described above, only a measure to drive out air getting into the nozzle is not yet sufficient. Further, in the case where a printed matter is exposed to a high temperature, an ink having a low phase change temperature range causes transfer (offset) on a superposed matter.

A hot melt type ink jet recording system has many advantages as compared with a water soluble type ink jet recording system as described previously, and therefore it is expected to be applied to an OA apparatus, a printer for a home use and a facsimile. As described above, however, the problem that a highly reliable printing quality can not be obtained is involved and this has been a bottleneck for a commercialization.

SUMMARY OF THE INVENTION

Accordingly, the object of the present invention is to provide a hot melt type ink for an ink jet which has a small rate of a volume change accompanied with a phase change from a melt status to a solid matter and does not cause an offset and which provides a clear color image on an OHP sheet.

The essential point of the present invention for solving the subject described above resides in (1) a hot melt type ink composition for an ink jet which can form a recording dot by heating and liquefying a solid ink and jetting it on a paper for recording, wherein a rate of a volume change (hereinafter referred to as volume change rate) accompanied with a phase change falls in the range of zero to less than 10%, preferably 4 to 8% and (2) the hot melt type ink composition for an ink jet described in (1), wherein a phase change temperature range falls within the range of 60° C. to the jetting temperature at which the ink composition is jetted.

BRIEF DESCRIPTION OF THE DRAWING

FIGURE is the graph showing the results of a volume change rate measurement of the ink composition of the present invention and the conventional ink composition. Plots 1 and 2 in FIGURE are plots of the ink composition of Example 1 according to the present invention and the conventional ink composition, respectively.

DETAILED DESCRIPTION OF THE INVENTION

The volume change rate and phase change temperature range mentioned above are measured as follows.

A predetermined amount of an ink composition is precisely measured and charged into a glass dilatometer having a known volume. Mercury is filled up to a base line and a temperature is raised from a room temperature to 140° C. at a rate of 2° C. per minute to obtain a curve of specific volume vs. temperature as shown in FIGURE.

The volume change rate, which is accompanied with a phase change from liquid to solid, can be obtained by the following equation:

Volume change rate $(\%) = (B-A)/A \times 100$

A: Specific volume (ml/g) at the point A of phase change.
B: Specific volume (ml/g) at the point B of phase change.

The phase change temperature range means a range from the point A to the point B.

Determination of Points A and B

Point A is the point at which the transition from solid to liquid begins while the temperature is raised at a rate of 2° C./minute from room temperature, and is determined as the intersecting point between the straight line at a solid state and the straight line at a transition state (from solid to liquid) in the figure of temperature v.s. specific volume as shown in FIGURE.

Point B is the point at which the transition from solid to liquid finishes (i.e., at which the ink composition becomes liquid completely) while the temperature is raised at a rate of 2° C./minute from room temperature, and is determined as the intersecting point between the straight line at a transition state (from solid to liquid) and the straight line at a liquid state in the figure of temperature v.s. specific volume as shown in FIGURE.

While the temperature of the ink composition is raised from room temperature at a rate of 2° C./minute, the change of specific volume is as follows. While the transition from solid to liquid does not begin, an increase of the specific volume is small, but as soon as the transition begins, it becomes so large, and at the time when the transition finishes, it becomes small again.

A vehicle useful for the ink composition of the present invention preferably comprises a resin having the volume change rate of 5% or less such as polyamide, polyester, polyvinyl acetate, silicone, and coumarone. Preferred examples thereof include polyamide, polyester and polyvinyl acetate each having an excellent compatibility with a coloring agent.

Examples of the resin which is used in the present invention include Versamid 711, Versamid 725, Versamid 930, Versamid 940, Barsaron 1117, Barsaron 1138, and Barsaron 1300 (Henkel Co., Ltd.), Tohmide 391, Tohmide 393, Tohmide 394, Tohmide 395, Tohmide 397, Tohmide 509, Tohmide 535, Tohmide 558, Tohmide 560, Tohmide 1310, Tohmide 1396, Tohmide 90, and Tohmide 92 (Fuji Kasei Co., Ltd.) as a polyamide resin, KTR 2150 (Kao Corporation) as polyester, AC 401, AC 540 and AC 580 (Allied Chemical) as polyvinyl acetate, silicone SH 6018 (Toray Silicone Co., Ltd.), Silicone KR 215, Silicone KR 216 and Silicone KR 220 (Shin-Etsu Silicone Co., Ltd.) as silicone, and Escron G-90 (Nippon Steel Chemical Co., Ltd.) as coumarone. This resin series has a characteristic that the volume change rate thereof is as very small as the order of 5%. Further, it has a characteristic that it delays solidification of an ink by using in itself or in combination with at least one of fatty acid, fatty amide (including N-substituted fatty amide), glyceride and wax which are compatible with the other ink components.

The added amount of the resin to be used as the vehicle is generally from 10 to 60% by weight, preferably from 10 to 40% by weight based on the ink composition.

Examples of the fatty acid include stearic acid, arachic acid, behenic acid, lignoceric acid, cerotic acid, montanic acid, and melissic acid. Two or more of the fatty acids may be used in combination.

Examples of the fatty amide include lauric amide, stearic amide, oleic amide, erucic amide, ricinolic amide, stearate amide, palmitic amide, behenic amide, and brassidic amide. Two or more of the fatty amides may be used in combination.

Examples of the N-substituted fatty amide include N,N'-2-hydroxystearic amide, N,N'-ethylenebisoleic amide, N,N'-xylenebisstearic amide, monomethylol stearate amide, N-oleyl stearate amide, N-stearyl stearate amide, N-oleyl palmitate amide, N-stearyl erucate amide, N,N'-dioleyl adipate amide, N,N'-dioleyl sebacate amide, and N,N'-distearyl isophthalate amide. Two or more of the N-substituted fatty amides may be used in combination.

Examples of the glyceride include hardened castor oil, partially hydrogenated castor oil, extremely hardened oil of soy bean oil, extremely hardened oil of rape seed oil, and vegetative extremely hardened oil. Two or more of the glycerides may be used in combination.

Examples of the wax include paraffin wax selected from petroleum waxes, microcystalline wax, carnauba wax, and montan wax. Two or more of the waxes may be used in combination.

The total amount of the fatty acid, fatty amide, N-substituted fatty amide, glyceride and wax, which may be used in an arbitrary combination, is preferably from 30 to 80% by weight based on the ink composition.

A solvent dye having an excellent heat stability in dissolving in the vehicle described above is preferred as a coloring agent. An arbitrary coloring agent such as a lipophilic dye can be used as long as it is compatible with the other ink components.

To be concrete, those described below are included:
<Magenta dye>: MS Magenta. VP, MS Magenta HM-1450, and MS Magenta HSo-147 (Mitsui Toatsu Chemicals, Inc.), AIZEN SOT Red-1, AIZEN SOT Red-2, AIZEN SOT Red-3, AIZEN SOT Pink-1, and SPIRON Red GEH SPECIAL (Hodogaya Chemical Co., Ltd.), RESOLIN Red FB 200%, MACROLEX Red Violet R and MACROLEX ROT 5B (Bayer Japan), KAYASET Red B, KAYASET Red 130 and KAYASET Red 802 (Nippon Kayaku Co., Ltd.), PHLOXIN, ROSE BENGAL, and ACID Red (Daiwa Chemical Co., Ltd.), HSR-31 and DIARESIN Red K (Mitsubishi Kasei Corporation), and Oil Red (BASF Japan).
<Cyan dye>: MS CyanHM-1238, MS Cyan HSo-16, Cyan HSo-144, and MS Cyan VPG (Mitsui Toatsu Chemicals, Inc.), AIZEN SOT Blue-4 (Hodogaya Chemical Co., Ltd.), BESOLIN BR. Blue BGLN 200% MACROLEX Blue RR, CERES Blue GN, SIRIUS SUPRATURQ. Blue Z-BGL, and SIRIUS SUPRA TURQ. Blue FB-LL 330% (Bayer Japan), KAYASET Blue FR, KAYASET Blue N, KAYASET Blue 814, Turq. Blue GL-5 200, and Light Blue BGL-5 200 (Nippon Kayaku Co., Ltd.), DAIWA Blue 7000 and Oleosol Fast Blue GL (Daiwa Chemical Co., Ltd.), DIARESIN Blue P (Mitsubishi Kasei Corporation), and SUDAN Blue 670, NEOPEN Blue 808 and ZAPON Blue 806 (BASF Japan).
<Yellow dye>: MS Yellow HSm-41, Yellow KX-7 and Yellow EX-27 (Mitsui Toatsu Chemicals, Inc.), AIZEN SOT Yellow-1, AIZEN SOT Yellow-3 and AIZEN SOT Yellow-6 (Hodogaya Chemical Co., Ltd.), MACROLEX Yellow 6G and MACROLEX FLUOR. Yellow 10GN (Bayer Japan), KAYASET Yellow SF-G, KAYASET Yellow 2G, KAYASET Yellow A-G, and KAYASET Yellow E-G (Nippon Kayaku Co., Ltd.), DAIWA Yellow 330HB (Daiwa Chemical Co., Ltd.), HSY-68 (Mitsubishi Kasei Corporation), and SUDAN Yellow 146 and NEOPEN Yellow 075 (BASF Japan).
<Black dye>: MS Black VPC (Mitsui Toatsu Chemicals, Inc.), AIZEN SOT Black-1 and AIZEN SOT Black-5 (Hodogaya Chemical Co., Ltd.), RESOLIN Black GSN 200% and RESORIN Black BS (Bayer Japan), KAYASET Black A-N (Nippon Kayaku Co., Ltd.), DAIWA Black MSC (Daiwa Chemical Co., Ltd.), HSB-202 (Mitsubishi Kasei Corporation), and NEPTUNE Black X60 and NEOPEN Black X58 (BASF Japan).

An addition amount of the coloring agent is optimally 0.5 to 3 weight % based on an ink. The addition amount less than 0.5 weight % lowers an image quality. Two kinds or more of the coloring agent can be used in a mixture for adjusting a color.

In order to further provide the ink composition of the present invention with a functionality, various surface treating agents, surface active agents, viscosity lowering agents, anti-oxidizing agents and fungicides can be mixed.

Since a rate of a volume change of the ink composition accompanied with a phase change from a melt status to a solid matter is decreased to a large extent according to the present invention, a bubble is prevented from being brought in cooling. The phase change temperature range controlled to 60 to the jetting temperature prevents an offset from generating even in the case where a printed matter is exposed to a high temperature, and a highly reliable printing quality can be obtained.

EXAMPLES

Next, the present invention will be explained with reference to the examples. There are shown in Table 1, an ink composition, the volume change rate, the phase change temperature range, the number of nozzles which jets normally in melting once again and jetting the ink, which is shown in terms of a jetting rate, and the result of an offset test carried out using a printed matter. The composition materials used for the ink, the manufacturer names and brand names thereof are shown in Table 2. In Table 2, M is a magenta dye; C is cyan dye; Y is a yellow dye; and Bk is a black dye.

remove impurities and the mixture was left for standing at a room temperature to obtain the even magenta hot melt ink.

About 2 g of this magenta hot melt ink was precisely measured and charged into a glass deratometer having a known volume. Mercury was filled up to a base line and a

TABLE 1

| Division | | Example 1 | 2 | 3 | 4 | 5 | 6 | 7 | 8 | 9 | 10 | 11 | Comparative Example 1 | 2 | 3 |
|---|---|---|---|---|---|---|---|---|---|---|---|---|---|---|---|
| Ink composition (wt %) | | | | | | | | | | | | | | | |
| Polyamide | P-1 | 55 | | | | 55 | 55 | 55 | | | | 50 | | | |
| | P-2 | | 28 | 28 | 28 | | | | | | | | | | |
| Polyester | E-1 | | | | | | | | 55 | | | | | | |
| Polyvinyl acetate | V-1 | | | | | | | | | 28 | | | | | |
| Silicone | S-1 | | | | | | | | | | 28 | | | | |
| Fatty acid | A-1 | 43 | | | | 43 | 43 | 43 | 43 | | | 45 | | | |
| | A-2 | | | | | | | | | | | | | 48 | 30 |
| Fatty amide | F-1 | | 70 | | | | | | | 70 | | | 68 | | |
| Glyceride | G-1 | | | 70 | | | | | | | | | | 50 | |
| Wax | W-1 | | | | 70 | | | | | | 70 | | 30 | | 48 |
| Anti-oxidizing agent | AO-1 | | | | | | | | | | | 3 | | | |
| Viscosity-lowering agent | VT-1 | | | | | | | | | | | | | | 20 |
| Dye | M | 2.0 | 2.0 | 2.0 | 2.0 | | | | 2.0 | 2.0 | 2.0 | 2.0 | 2.0 | 2.0 | 2.0 |
| | C | | | | | 2.0 | | | | | | | | | |
| | Y | | | | | | 2.0 | | | | | | | | |
| | Bk | | | | | | | 2.0 | | | | | | | |
| Evaluation results | | | | | | | | | | | | | | | |
| Volume change rate (%) | | 5.1 | 6.2 | 6.8 | 7.0 | 4.9 | 4.9 | 4.9 | 4.8 | 5.9 | 6.0 | 5.4 | 16.2 | 15.3 | 15.5 |
| Phase change temperature (°C.) range | | 65–108 | 62–100 | 62–105 | 65–110 | 65–108 | 65–108 | 65–108 | 68–110 | 68–105 | 60–105 | 61–100 | 66–100 | 65–103 | 40–90 |
| Jetting rate (%) | | 100 | 100 | 100 | 100 | 100 | 100 | 100 | 100 | 100 | 100 | 100 | 68 | 64 | 66 |
| Off set | | A | A | A | A | A | A | A | A | A | A | A | A | A | B |

TABLE 2

| Division | Symbol | Manufacturer | Brand Name |
|---|---|---|---|
| Polyamide | P-1 | Fuji Kasei Co., Ltd. | Tohmide 92 |
| | P-2 | Henkel Co., Ltd. | Versamid 335 |
| Polyester | E-1 | Kao Corporation | KTR 2150 |
| Polyvinyl acetate | V-1 | Allied Chemical Co., Ltd. | AC 401 |
| Silicone | S-1 | Toray Silicone Co., Ltd. | SH 6018 |
| Fatty acid | A-1 | Wako Pure Chemical Industries, Ltd. | Stearic Acid |
| | A-2 | Wako Pure Chemical Industries, Ltd. | Behenic Acid |
| Fatty amide | F-1 | Kao Corporation | Fatty Amide ON |
| Glyceride | G-1 | Kawaken Fine Chemicals Co., Ltd. | RH-60 |
| Wax | W-1 | Noda Wax Co., Ltd. | Carnauba Wax |
| Anti-oxidizing agent | AO-1 | Ethyl Corporation | ETHANOX 398 |
| Viscosity-lowering agent | VT-1 | Kao Corporation | Exceparl HD-PB |
| Dye | M | Hodogaya Chemical Co., Ltd. | AIZEN SOT Pink-1 |
| | C | Daiwa Chemical Co., Ltd. | Oleosol Fast Blue GL |
| | Y | BASF Japan | NEOPEN Yellow 075 |
| | Bk | Bayer Japan | RESOLIN Black BS |

Example 1

As described in Table 1 and Table 2, there were mixed 55 weight % of polyamide (brand name: Tohmide 92 manufactured by Fuji Kasei Co., Ltd.), 43 weight % of fatty acid (brand name: Stearic Acid manufactured by Wako Pure Chemicals Industries, Ltd.), and 2.0 weight % of a magenta dye (brand name: AIZEN SOT Pink-1 manufactured by Hodogaya Chemical Co., Ltd.) to prepare a magenta hot melt type ink. This mixture was heated at 120°±10° C. until an even melt mixture was obtained (about 2 hours). Subsequently, heating pressure filtration was carried out to temperature was raised from a room temperature to 140° C. at a rate of 2° C. per minute to obtain a curve of specific volume vs. temperature as shown in FIGURE. The volume change rate and phase change temperature were determined in the above-described manner, and are shown in Table 1.

The above-prepared ink composition was evaluated in terms of jetting rate and offset as follows.

1. Jetting Rate

The obtained ink was charged into an ink jet printer (model: JOLT S JO1A, manufactured by Hitachi Koki Co., Ltd.) and it was confirmed that the ink was jetted at 130° C.

from all of the 96 nozzles. After an electric power supply was cut and the ink was completely solidified (about 4 hours), the ink was melted once again and there was observed the number of the nozzles which did not work well when they were jetted once again (in the case where all of the 96 nozzles do not work well, a jetting rate is 0%).

2. Offset

A general copying paper was placed on the obtained printed matter, a load (4 kg) was placed thereon, and it was allowed to stand for 6 hours under a temperature of 55° C. The resulting printed matter was checked in terms of blur of an ink, and the copying paper was checked in terms of transfer of an ink. The criterion was as follows.

A: Neither blur nor transfer was observed.

B: Blur or transfer, or the both were observed.

The obtained results are shown in Table 1.

As apparent from Table 1, the results were that in Example 1, the phase change temperature range was 65° to 108° C. and the volume change rate was 5.1%, which was smaller than a value of the order of 15% in a conventional ink, and that the jetting rate was 100% and the evaluation of an offset was good as well. Further, an ink height was 20 micron or less and an adhesion was sufficient.

Example 2

The hot melt type ink was prepared in the same manner as in Example 1, except that 28 weight % of Versamid 335 (manufactured by Henkel Co., Ltd.) as polyamide was used in place of Tohmide 92 and 70 weight % of fatty amide (brand name: Fatty Amide ON, manufactured by Kao Corporation) was used in place of fatty acid (stearic acid). The obtained ink was evaluated in the same manner as in Example 1 and the results are shown in Table 1, which were similar to those of Example 1. The phase change temperature range was 62° to 100° C. and the volume change rate was 6.2%, which was smaller than that of the conventional ink, and that the jetting rate was 100% and the evaluation of the offset was good as well.

Example 3

The hot melt type ink was prepared in the same manner as in Example 2, except that glyceride (brand name: RH-60, manufactured by Kawaken Fine Chemicals Co., Ltd.) was used in place of fatty amide (Fatty Amide ON). The obtained ink was evaluated in the same manner as in Example 1 and the results are shown in Table 1, which were similar to those of Example 1. The phase change temperature range was 62° to 105° C. and the volume change rate was 6.8%, which was smaller than that of the conventional ink, and that the jetting rate was 100% and the evaluation of the offset was good as well.

Example 4

The hot melt type ink was prepared in the same manner as in Example 2, except that wax (brand name: Carnauba Wax, manufactured by Noda Wax Co., Ltd.) was used in place of fatty amide (Fatty Amide ON). The obtained ink was evaluated in the same manner as in Example 1 and the results are shown in Table 1, which were similar to those of Example 1. The phase change temperature was 65° to 110° C. and the volume change rate was 7.0%, which was smaller than that of the conventional ink, and that the jetting rate was 100% and the evaluation of the offset was good as well.

Example 5

The hot melt type ink was prepared in the same manner as in Example 1, except that the cyan dye (brand name: Oleosol Fast Blue GL, manufactured by Daiwa Chemical Co., Ltd.) was used in place of AIZEN SOT Pink-1. The obtained ink was evaluated in the same manner as in Example 1 and the results are shown in Table 1, which were similar to those of Example 1. The phase change temperature range was 65° to 108° C. and the volume change rate was 4.9%, which was smaller than that of the conventional ink, and that the jetting rate was 100% and the evaluation of the offset was good as well.

Example 6

The hot melt type ink was prepared in the same manner as in Example 1, except that the yellow dye (brand name: NEOPEN Yellow 075, manufactured by BASF Japan Co., Ltd.) was used in place of AIZEN SOT Pink-1. The obtained ink was evaluated in the same manner as in Example 1 and the results are shown in Table 1, which were similar to those of Example 1. The phase change temperature range was 65° to 108° C. and the volume change rate was 4.9%, which was smaller than that of the conventional ink, and that the jetting rate was 100% and the evaluation of the offset was good as well.

Example 7

The hot melt type ink was prepared in the same manner as in Example 1, except that the black dye (brand name: RESOLIN Black BS, manufactured by Bayer Japan Co., Ltd.) was used in place of AIZEN SOT Pink-1. The obtained ink was evaluated in the same manner as in Example 1 and the results are shown in Table 1, which were similar to those of Example 1. The phase change temperature range was 65° to 108° C. and the volume change rate was 4.9%, which was smaller than that of the conventional ink, and that the jetting rate was 100% and the evaluation of the offset was good as well.

Example 8

The hot melt type ink was prepared in the same manner as in Example 1, except that polyester (brand name: KTR 2150, manufactured by Kao Corporation) was used in place of polyamide (Tohmide 92). The Obtained ink was evaluated in the same manner as in Example 1 and the results are shown in Table 1, which were similar to those of Example 1. The phase change temperature range was 68° to 110° C. and the volume change rate was 4.8%, which was smaller than that of the conventional ink, and that the jetting rate was 100% and the evaluation of the offset was good as well.

Example 9

The hot melt type ink was prepared in the same manner as in Example 2, except that polyvinyl acetate (brand name: AC 401, manufactured by Allied Chemical Co., Ltd.) was used in place of polyamide (Versamid 335). The obtained ink was evaluated in the same manner as in Example 1 and the results are shown in Table 1, which were similar to those of Example 1. The phase change temperature range was 68° to 105° C. and the volume change rate was 5.9%, which was smaller than that of the conventional ink, and that the jetting rate was 100% and the evaluation of the offset was good as well.

Example 10

The hot melt type ink was prepared in the same manner as in Example 4, except that silicone (brand name: Silicone SH 6018, manufactured by Toray Silicone Co., Ltd.) was used in place of polyamide (Versamid 335). The obtained ink was evaluated in the same manner as in Example 1 and the results are shown in Table 1, which were similar to those of Example 1. The phase change temperature range was 60° to 105° C. and the volume change rate was 6.0%, which was smaller than that of the conventional ink, and that the jetting rate was 100% and the evaluation of the offset was good as well.

Example 11

The hot melt type ink was prepared in the same manner as in Example 1, except that the amounts of Tohmide 92 and stearic acid were charged to 50 weight % and 45 weight %, respectively. and 3 weight % of an anti-oxidizing agent (brand name: ETHANOX 398, manufactured by Ethyl Corporation) were added. The obtained ink was evaluated in the same manner as in Example 1 and the results are shown in Table 1, which were similar to those of Example 1. The phase change temperature range was 61° to 100° C. and the volume change rate was 5.4%, which was smaller than that of the conventional ink, and that the jetting rate was 100% and the evaluation of the offset was good as well.

Comparative Example 1

The hot melt type ink was prepared in the same manner as that in Example 1, except that 68 weight % of Fatty Amide ON, 30 weight % of Carnauba Wax and 2.0 weight % of AIZEN SOT Pink-1 were used instead. The obtained ink was evaluated in the same manner as in Example 1 and the results are shown in Table 1. While the phase change temperature range was 66° to 100° C. and the evaluation of the offset was good, the volume change rate was 16.2%, which was larger than that in Example 1, and the jetting rate was 68%.

Comparative Example 2

The hot melt type ink was prepared in the same manner as that in Example 1, except that 48 weight % of fatty acid (brand name: Behenic Acid, manufactured by Wako Pure Chemicals Industries, Ltd.) and 50 weight % of RH-60 and 2.0 weight % of AIZEN SOT Pink-1 were used instead. The obtained ink was evaluated in the same manner as in Example 1 and the results are shown in Table 1. While the phase change temperature range was 65° to 103° C. and the evaluation of the offset was good, the volume change rate was 15.3%, which was larger than that in Example 1, and the jetting rate was 64%.

Comparative Example 3

The hot melt type ink was prepared in the same manner as that in Example 1, except that 30 weight % of Behenic Acid, 48 weight % of Carnauba Wax and 20 weight % of a viscosity-lowering agent (brand name: Exceparl HD-PB, manufactured by Kao Corporation) and 2.0 weight % of AIZEN SOT Pink-1 were used instead. The obtained ink was evaluated in the same manner as in Example 1 and the results are shown in Table 1. Since the phase change temperature range was 40° to 90° C., the evaluation of the offset was not good and that the volume change rate was 15.5%, which was larger than that in Example 1 and the jetting rate was 66%.

While the invention has been described in detailed with reference to specific embodiments, it will be apparent to one skilled in the art that various changes and modifications can be made to the invention without departing from its spirit and scope.

What is claimed is:

1. A method of printing with an ink jet comprising the steps of:
   preparing an ink that is a solid at room temperature, that has a rate of volume change accompanied with a phase change within a range of less than 10%, and that comprises at least one resin selected from the group consisting of a polyamide resin, a polyester resin, a polyvinyl acetate resin, a silicone resin and coumarone;
   liquefying the ink by heating; and
   jetting the ink onto a substrate with an ink jet.

2. The method of printing according to claim 1, wherein the ink has a rate of volume change accompanied with a phase change within the range of 4% to less than 10%.

3. The method of printing according to claim 2, wherein the ink has a rate of volume change accompanied with a phase change within the range of 4% to 8%.

4. The method of printing according to claim 1, wherein the phase change temperature range of the ink falls within a range of 60° C. to the temperature at which the ink is liquefied.

5. The method of printing according to claim 1, wherein the at least one resin has a volume change rate of 5% or less.

6. The method of printing according to claim 1, wherein the resin is present in an amount of from 10 to 60% by weight based on the ink.

7. The method of printing according to claim 6, wherein the resin is present in an amount of from 10 to 40% by weight based on the ink.

8. The method of printing according to claim 1, wherein the at least one resin is at least one resin selected from the group consisting of the polyamide resin, the polyester resin and the polyvinyl acetate resin.

9. The method of printing according to claim 1, wherein the ink further comprises a coloring agent.

10. The method of printing according to claim 9, wherein the coloring agent is present in an amount of from 0.5 to 3% by weight based on the ink.

* * * * *